(12) United States Patent
Egemen

(10) Patent No.: US 10,730,559 B2
(45) Date of Patent: Aug. 4, 2020

(54) FRAME CHASSIS EMBODIMENT PROVIDING HIGH STRENGTH AND SAFETY FOR VEHICLES DURING ACCIDENTS

(71) Applicant: Ertugrul Egemen, Amasya (TR)

(72) Inventor: Ertugrul Egemen, Amasya (TR)

(73) Assignee: Ertugrul Egemen, Yozcat (TR)

( * ) Notice: Subject to any disclaimer, the term of this patent is extended or adjusted under 35 U.S.C. 154(b) by 0 days.

(21) Appl. No.: 16/086,550

(22) PCT Filed: Mar. 29, 2016

(86) PCT No.: PCT/TR2016/050088
§ 371 (c)(1),
(2) Date: Sep. 19, 2018

(87) PCT Pub. No.: WO2017/171669
PCT Pub. Date: Oct. 5, 2017

(65) Prior Publication Data
US 2019/0071127 A1    Mar. 7, 2019

(51) Int. Cl.
| | | |
|---|---|---|
| *B62D 23/00* | (2006.01) | |
| *B62D 39/00* | (2006.01) | |
| *B62D 21/02* | (2006.01) | |
| *B62D 21/15* | (2006.01) | |

(52) U.S. Cl.
CPC .......... *B62D 23/005* (2013.01); *B62D 21/02* (2013.01); *B62D 21/157* (2013.01); *B62D 23/00* (2013.01); *B62D 39/00* (2013.01)

(58) Field of Classification Search
CPC .................................................. B62D 23/005
USPC ............................................. 296/205, 187.02
See application file for complete search history.

(56) References Cited

U.S. PATENT DOCUMENTS

| | | | | |
|---|---|---|---|---|
| 2,269,451 | A * | 1/1942 | Ford .................... | B62D 23/005 296/205 |
| 4,640,527 | A * | 2/1987 | Taylor .................... | B60R 19/42 280/756 |
| 4,978,562 | A * | 12/1990 | Wycech ................ | B60J 5/0444 264/46.6 |
| 8,398,160 | B2 * | 3/2013 | Baumann .................. | B60J 7/11 296/187.13 |
| 10,029,736 | B1 * | 7/2018 | Arora .................... | B62D 25/06 |
| 2011/0285170 | A1 | 11/2011 | Asaga et al. | |
| 2011/0298189 | A1 | 12/2011 | Schneider et al. | |

FOREIGN PATENT DOCUMENTS

| | | |
|---|---|---|
| FR | 2 822 431 A1 | 9/2002 |
| WO | 2010/071664 A1 | 6/2010 |

OTHER PUBLICATIONS

European Patent Office, PB 5818 Patentlaan 2L; NL; Dec. 1, 2016.

\* cited by examiner

*Primary Examiner* — Dennis H Pedder

(57) ABSTRACT

A chassis (200) embodiment having a geometrical structure surrounding the side and upper parts a vehicle (100), and with this geometrical structure, providing high damping effect in case of an accident, and it is characterized in comprising; a lower chassis extension (210) having front arms (211) configured at the upper part of said vehicle (100) and an upper dampener chassis (220) configured on said lower chassis extension (210).

7 Claims, 5 Drawing Sheets

Figure 1:
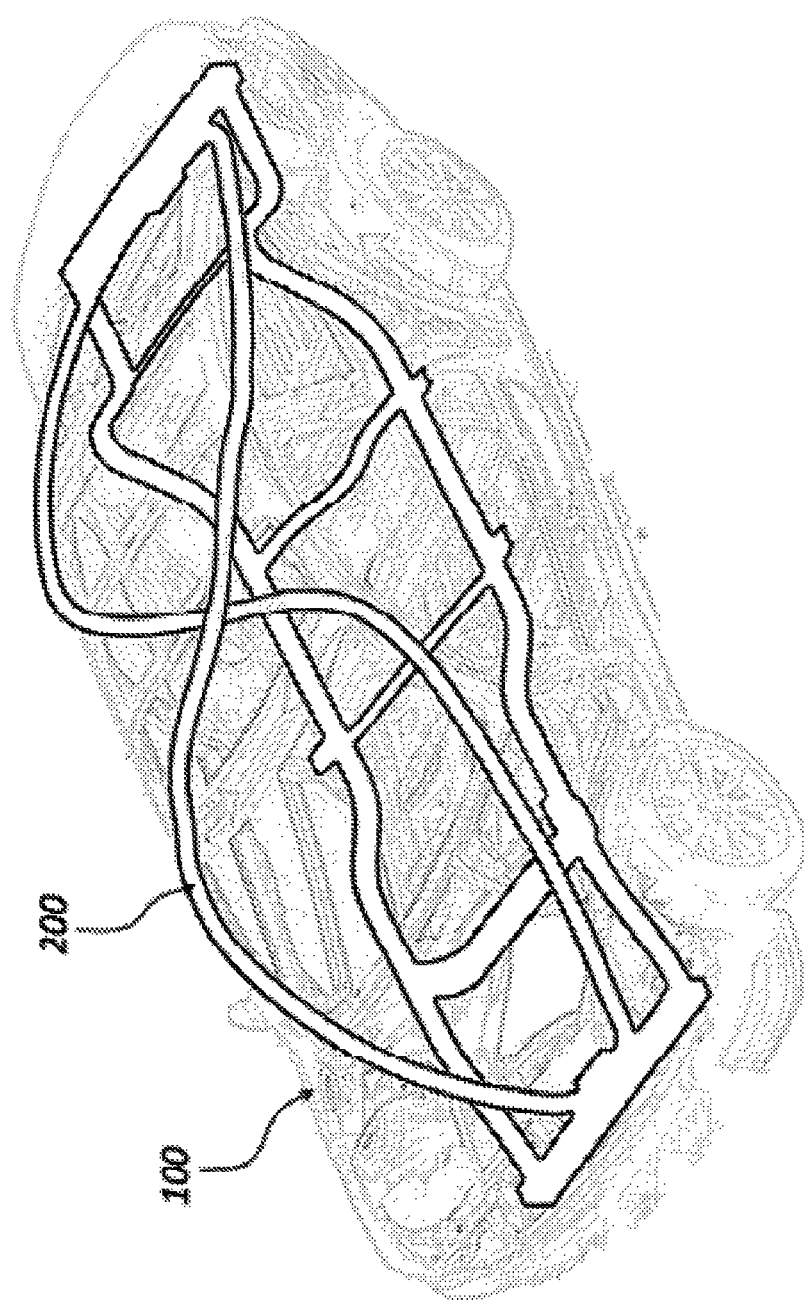

FRAME CHASSIS EMBODIMENT PROVIDING HIGH STRENGTH AND SAFETY FOR VEHICLES DURING ACCIDENTS

THE RELATED ART

The invention relates to a frame chassis having a geometrical structure surrounding the side and upper parts of vehicles, and with this geometrical structure, providing high damping effect by means of extending the impact over a period of time, and also preventing the vehicle top from being collapsed in case the vehicle is overturned.

THE PRIOR ART

Vehicle chassis is a fundamental main bearer structure comprising various systems of automobiles and bearing the vehicle body. A chassis is required to be durable, light, rigid, formed of few parts, and have an easily mountable-demountable structure as well as being low cost.

In modern automobiles, instead of the old hard and thick chassis frameworks, mostly cage-shaped light structures in a single-shell or block form are used. Some part of the body/framework is in the form of a cage protecting passengers, while the remaining parts can be crushed in case of an accident. These parts absorb most of the energy that may occur in case of an accident and guides the remaining energy such that it would not give harm to the passengers.

A vehicle in motion receives reactions due to the irregularities of the road. These may cause deformations such as vertical bending and vertical twisting. These deformations are usually manifested in the form of continuously changing vibrations at the frequencies that are dependent on the rigidity of the associated organs.

The prior art chassis embodiments ensure damping by means of deformation of the lower chassis in case of an accident. Basically, the metal alloys used in production of chassis determine this rate of damping. The prior art systems are inadequate in terms of this rate as well as their ability to extend the effect of the impact into a period of time. As a result, the impacts of accidents are quite high on the passengers and the vehicle. Moreover, it does not provide a solution for vehicles that are overturned. The ability of vehicles for damping the impacts received from the top is quite inadequate.

DESCRIPTION OF THE INVENTION

The purpose of the invention is to provide a vehicle chassis that has different technical characteristics than the prior art vehicle chassis embodiments and brings an initiative to the related technical field.

A purpose of the invention is to have a geometrical structure surrounding the side and upper parts a vehicle, and with this geometrical structure, provide high damping effect in case of an accident.

Another purpose of the invention is to have a characteristic of extending/spreading the effect of the impact into a period of time in case of an accident due to its geometrical structure. As a result, the structure reduces the reaction force and the inertial forces of all objects including the passengers within the vehicle during an accident.

Another purpose of the invention is to prevent the collapse of the vehicle top in case the vehicle is overturned, due to its geometrical structure surrounding the side and the top parts of the vehicle, the above said fundamental physical principles, and its semi-circular structure as can be seen from the side profile.

Another purpose of the invention is to provide a chassis embodiment protecting passengers in a cage due to its geometrical structure and reducing their risks for receiving an impact.

A significant purpose of the invention is to ensure high level of safety in accidents and thus minimize deaths and injuries.

Another purpose of the invention is to enable use of the potential energy received by the vehicle due to its structure surrounding its side and upper parts during its repairs after the accident.

FIGURES FOR BETTER UNDERSTANDING OF THE INVENTION

FIG. 1; is a perspective view the chassis embodiment according to the invention adapted to a vehicle.

Figure 2:
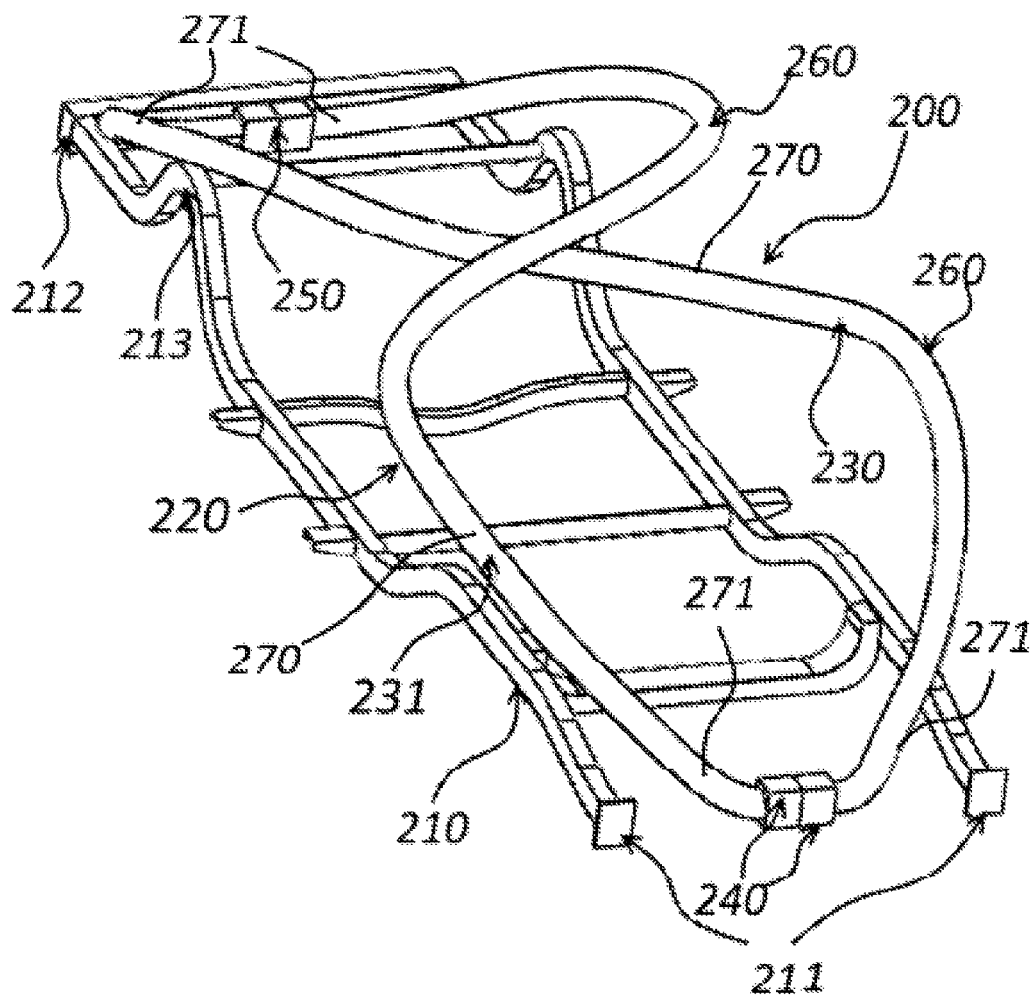

FIG. 2; is an individual perspective view of the chassis embodiment according to the invention.

Figure 3:
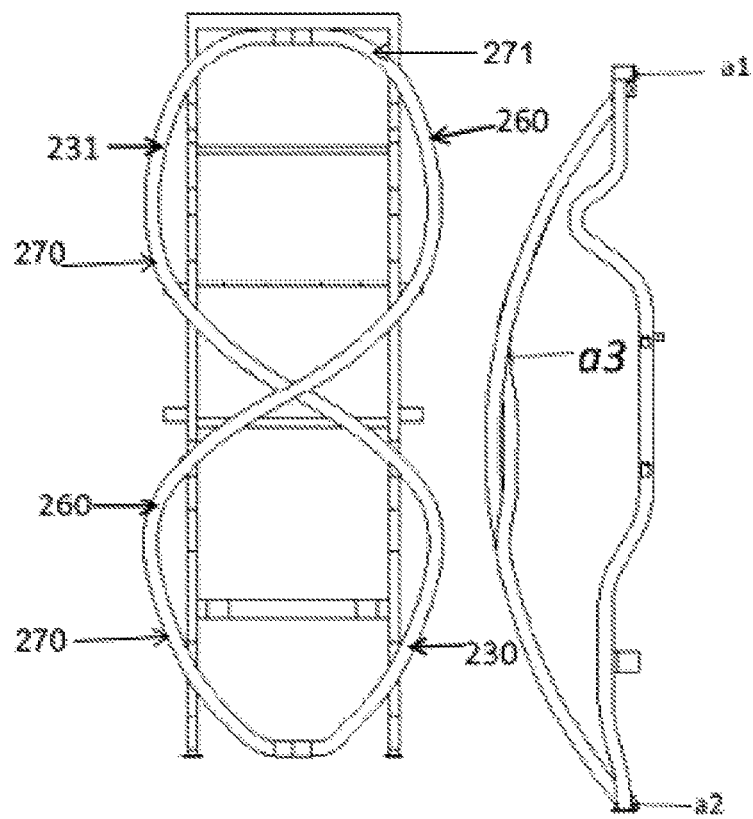

FIG. 3; shows two-dimensional individual front and side perspective views of the chassis embodiment according to the invention.

Figure 4:
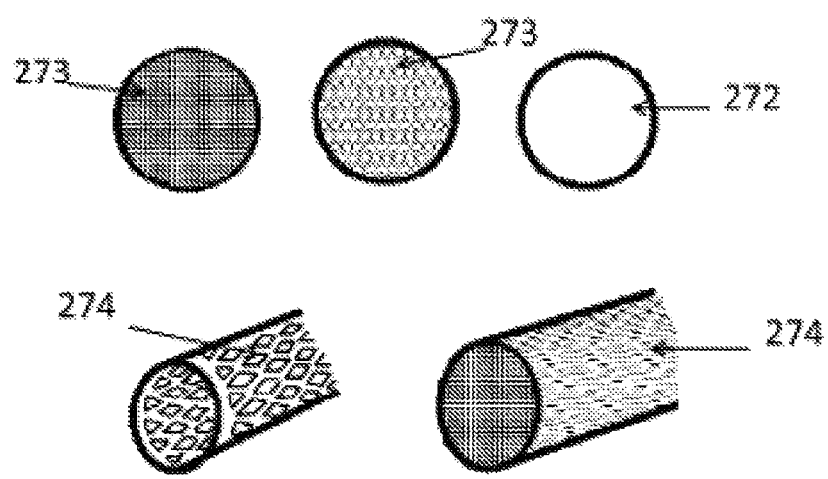

FIG. 4; shows two-dimensional section views of various forms and variations of dampener profiles.

Figure 5:
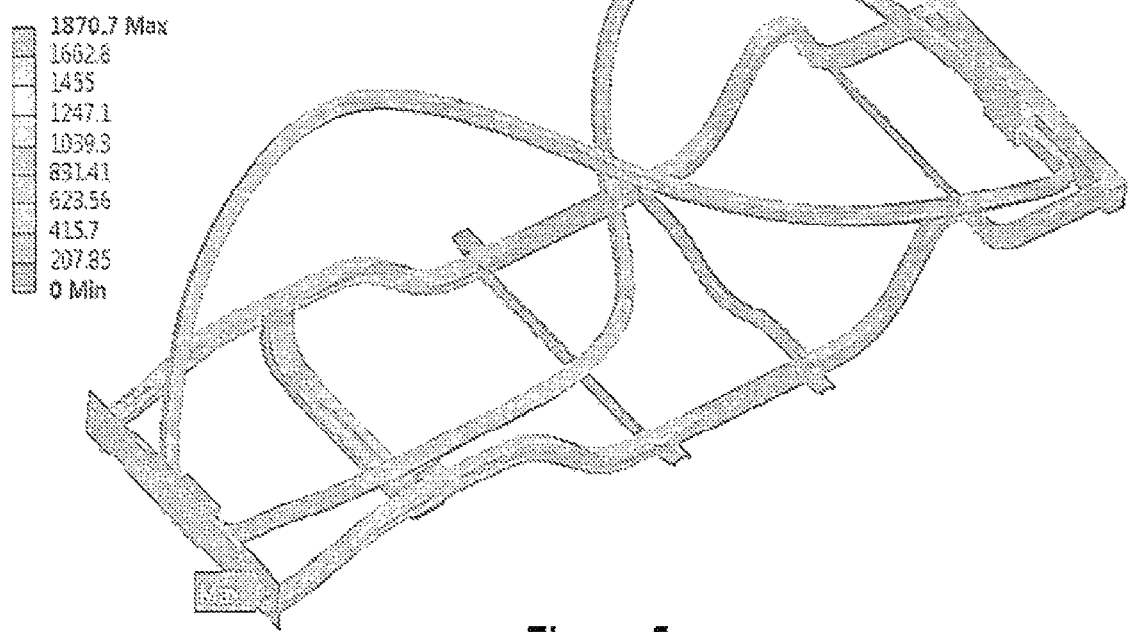

FIG. 5; is a view showing the stress analysis results for the chassis embodiment according to the invention.

Figure 6:
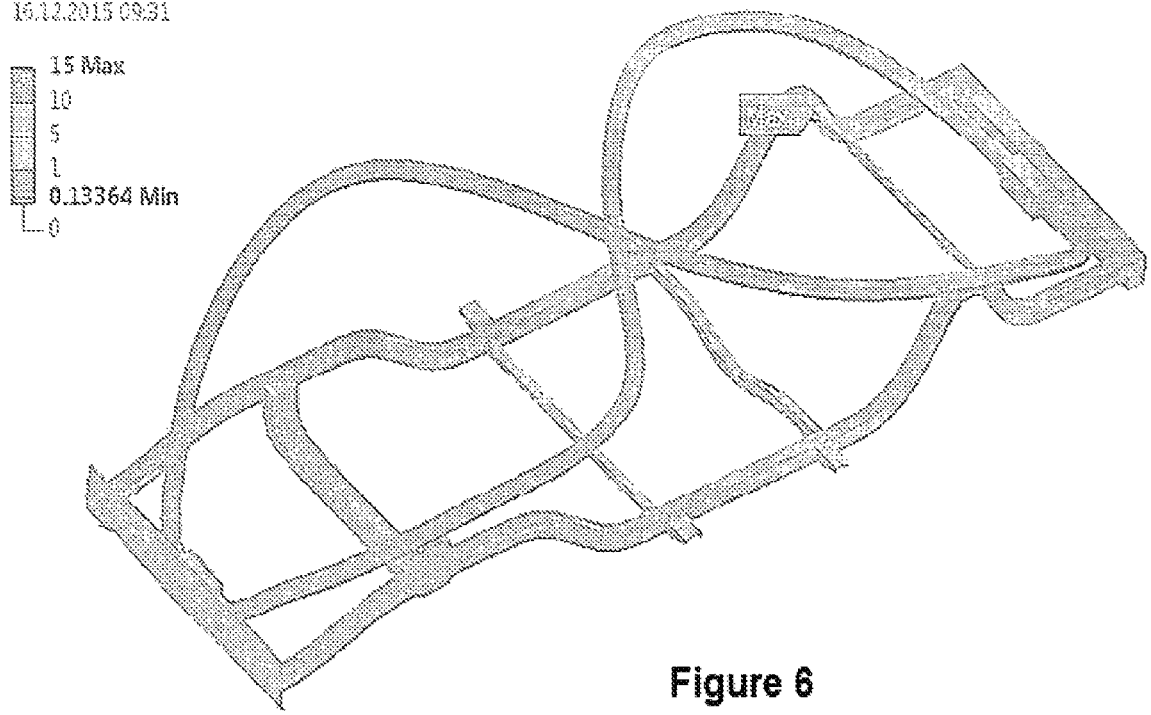

FIG. 6; is a view showing the analysis results of safety factors for the chassis embodiment according to the invention.

Figure 7:
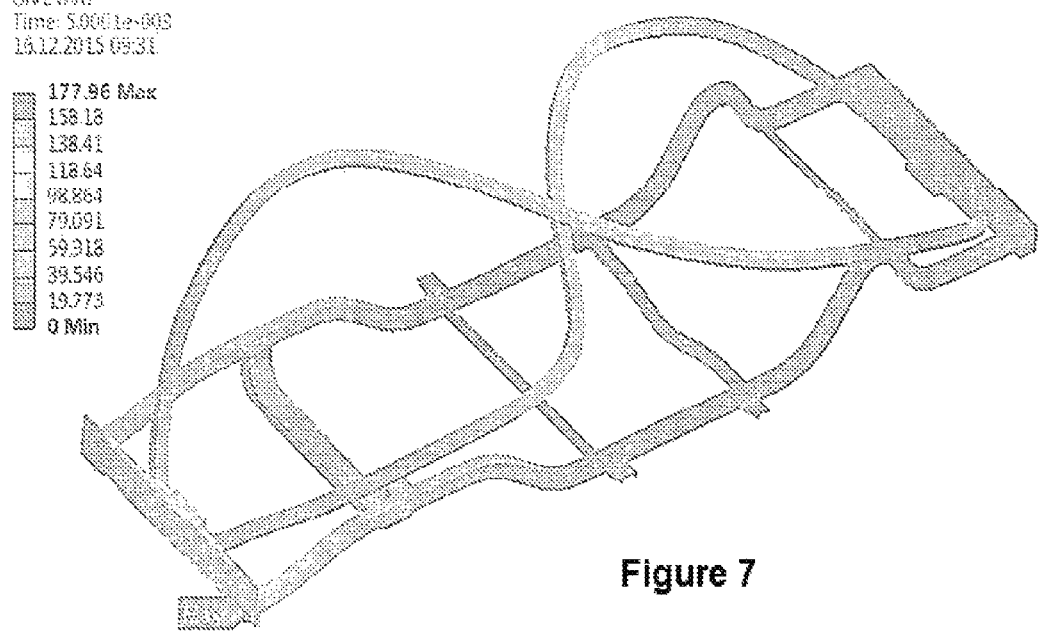

FIG. 7; is a view showing the analysis results of deformation and expected life values for the chassis embodiment according to the invention.

Figure 8:
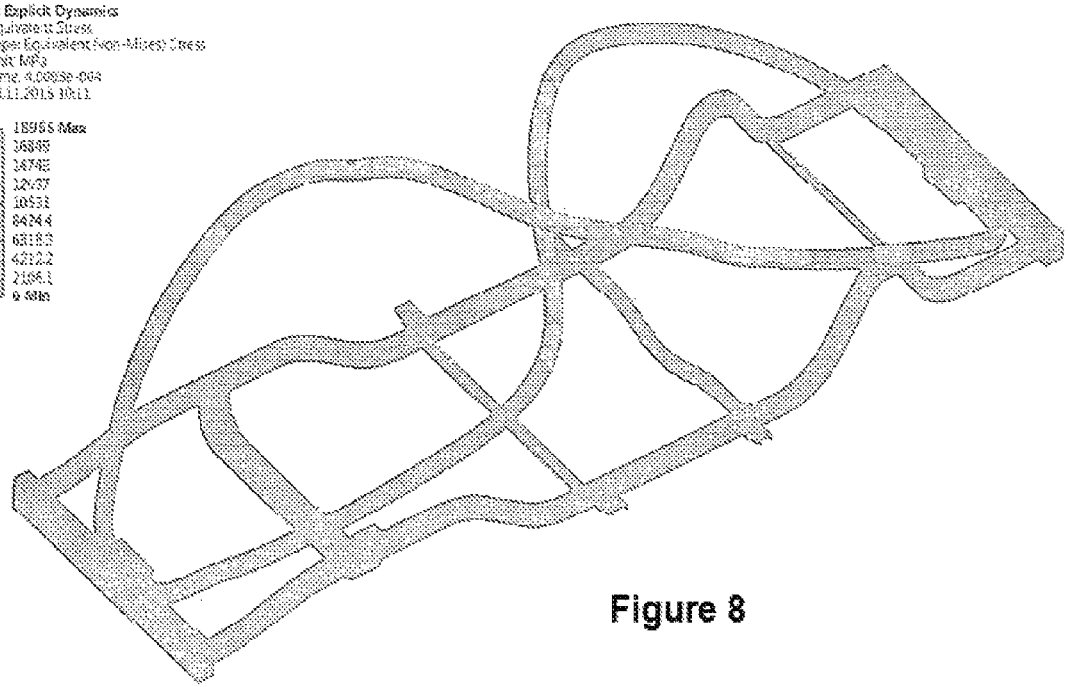

FIG. 8; is a view showing the stress analysis results for the chassis embodiment according to the invention made at another time.

REFERENCE NUMBERS

100. Vehicle
200. Chassis
210. Lower chassis extension
211. Front arms
212. Rear support sheet bar
213. Strength bend
220. Upper dampener chassis
230. Upper right dampener
231. Upper left dampener
240. Front mounting stabilizers
250. Rear mounting stabilizers
260. S form
270. Ellipse form
271. Circular form
272. Hollow form
273. Porous form
274. Outer-surface hollow forms
a1. Rear end
a2. Front end
a3. Crescent form

DETAILED DESCRIPTION OF THE INVENTION

FIGS. 1 and 2 show the chassis (200) embodiment having a geometrical structure surrounding the side and upper parts of vehicles (100), and with this geometrical structure, providing high damping effect in case of an accident. It comprises a lower chassis extension (210) having front arms (211) configured at the upper part of said vehicle (100) and an upper dampener chassis (220) configured on said lower chassis extension (210).

FIG. 3; shows two-dimensional individual front and side perspective views of the chassis (200) embodiment according to the invention. In this view, the upper dampener chassis (220) is shown, which is positioned so as to form a crescent form (a3) from the rear end (a1) to the front end (a2) of the lower chassis extension (210). Likewise; from the top view; said upper dampener chassis (220) comprises an upper right dampener (230) and an upper left dampener (231) positioned on top of each other with a two-piece structure, forming an S-form (260). However, the upper right dampener (230) and the upper left dampener (231) can be produced as a single piece structure, as well as being produced individually.

It is possible to produce the upper dampener chassis (220) having a circular section from the rear end (a1) to the front end (a2) such that it would have an ellipse-formed section at some parts, especially at points where force intensity is high.

Besides, when the upper right dampeners (230) and the upper left dampeners (231) are produced individually, they comprise rear mounting stabilizers (250) and front mounting stabilizers (240). The lower chassis extension (210) of the main chassis (200) comprises rear support sheet bars (212) on which said rear mounting stabilizers (250) leaning. Also, strength bends (213) are formed as extending forward from the rear support sheet bars (212) of the lower chassis extension (210).

In FIG. 4; two-dimensional section views of various forms and variations of the upper right dampeners (230) and the upper left dampeners (231) are shown. The above said upper dampener chassis (220) that have an ellipse form section or a full circle form section may also preferably have a solid or hollow form (272). Likewise, said upper right dampeners (230) and upper left dampeners (231) comprise porous section forms (273) having different geometrical shapes. Moreover, the outer surfaces of the upper right dampeners (230) and the upper left dampeners (231) comprise outer-surface hollow forms (274) having different geometrical shapes.

The chassis (200) according to the invention provides maximum energy damping at the moment of impact due to its geometrical structure. The chassis (200) reduces the reaction force and the inertial force that would cause damage during impact, by means of spreading the acceleration caused by sudden change of speed at the moment of impact/crush due to its distance. The upper dampener chassis (220), first of all, takes a big portion of the energy on itself, which would otherwise completely reach the standard chassis, and minimizes the damage by means of converting kinetic energy (V=velocity of the vehicle, m=mass of the vehicle, $E=\frac{1}{2} m.V^2$) into potential energy (k=spring constant, x=spring contraction distance, $E=\frac{1}{2}k.x^2$). In the light of this relation, the upper dampener chassis (220) would linearly reduce the contraction distance (x) and the vehicle speed (V), since the vehicle mass (m) and (k) are constant. The proportional reduction in this speed (V) causes the impact/crush time (t) to extend at each unit distance (x) (distance=V.t). Therefore, this situation causes the acceleration (a) of the vehicle to be low, since acceleration (a) equals to the change in velocity (ΔV) over change in time (Δt), which is a=ΔV/Δt. The force (F) applied on the vehicle equals to the product of the vehicle mass (m) with the acceleration (a), which is F=m.a. In this way, the acceleration reduced by means of the upper dampener chassis (220) would reduce the reaction and inertial forces. Moreover, by means of changing the spring constant (k) depending on the quality of the material to be used in production of the upper dampener chassis (220), it is possible to contribute to the reduction of the impacts of these forces.

In case this operating setup receives an impact from above, the upper dampener chassis (220) steps in. As can be understood from the figures, in case of receiving impact from the top, again due to its geometrical structure, the upper dampener chassis (220) stores the force on itself by means of reducing the force bi-directionally towards the end points (the lower chassis (210) to which it is connected) in relation with the above given relations. Moreover, the semi-circular structure of the upper dampener chassis (220), as can be seen from the side profile, contributes to this damping effect. The upper dampener chassis (220), therefore, ensures a superior damping against impacts received from the top.

The practicability and highly advantageous structure of the upper dampener chassis (220) is proven with the safety coefficient of "1" obtained in computer aided simulation applications.

The invention claimed is:

1. A chassis (200) comprising:
    a lower chassis portion extending along a length of said chassis between a first end and a second end of said chassis and having a width extending between a right side and a left side of the chassis;
    two upper dampener members each of which continuously extending along the length of said chassis and being coupled to said first end and to said second end, each of said upper dampener members includes curves alternately extending between said right side and said left side of said chassis forming thereby an S-shape form above said lower chassis.

2. The chassis (200) embodiment according to claim 1, wherein said two upper dampener members form a crescent form (a3) from the rear end (a1) to the front end (a2) of the lower chassis extension (210).

3. The chassis (200) embodiment according to claim 1, wherein said two upper dampener members include an upper right dampener (230) and an upper left dampener (231) positioned one on top of the other with a two-piece structure, forming the S-form (260).

4. The chassis (200) embodiment according to claim 1, wherein said two upper dampener members include rear mounting stabilizers (250) and front mounting stabilizers (240).

5. The chassis (200) embodiment according to claim 1, further comprising; strength bends (213) formed as extending forward from rear support sheet bars (212) of a lower chassis extension (210).

6. The chassis (200) embodiment according to claim 1, wherein said two upper dampener members are made of metal alloy or fibre material.

7. The chassis (200) embodiment according to claim 1, wherein said two upper dampener members has porous forms (273).

* * * * *